Patented Oct. 6, 1931

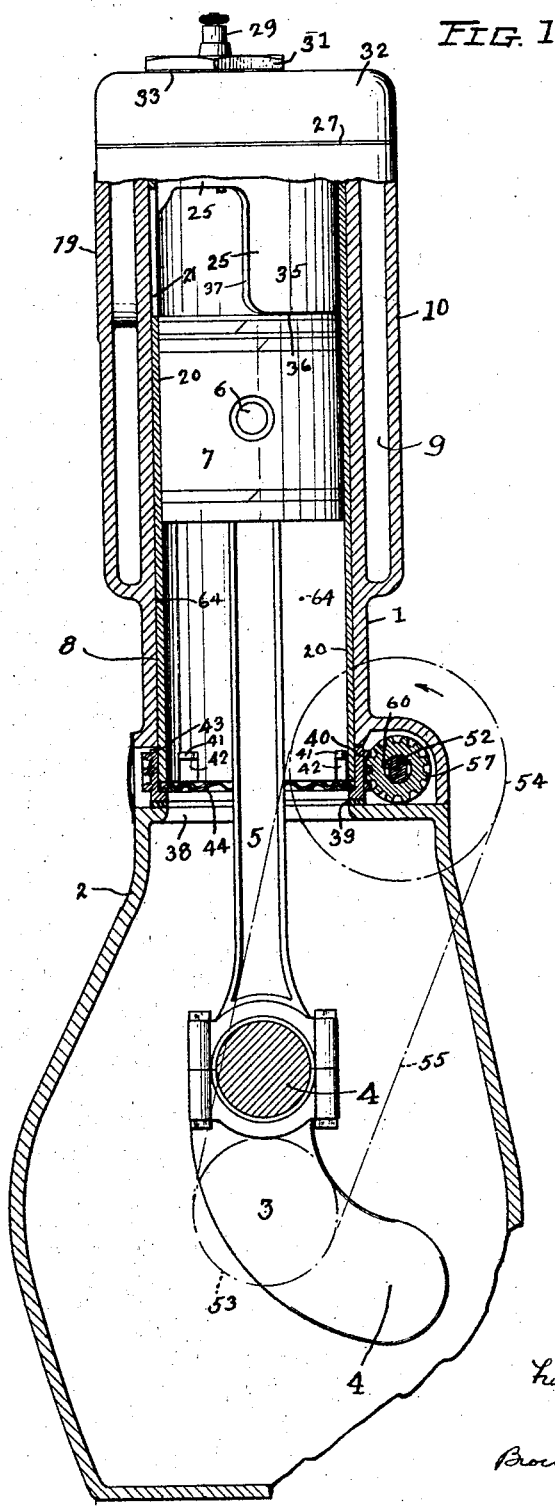

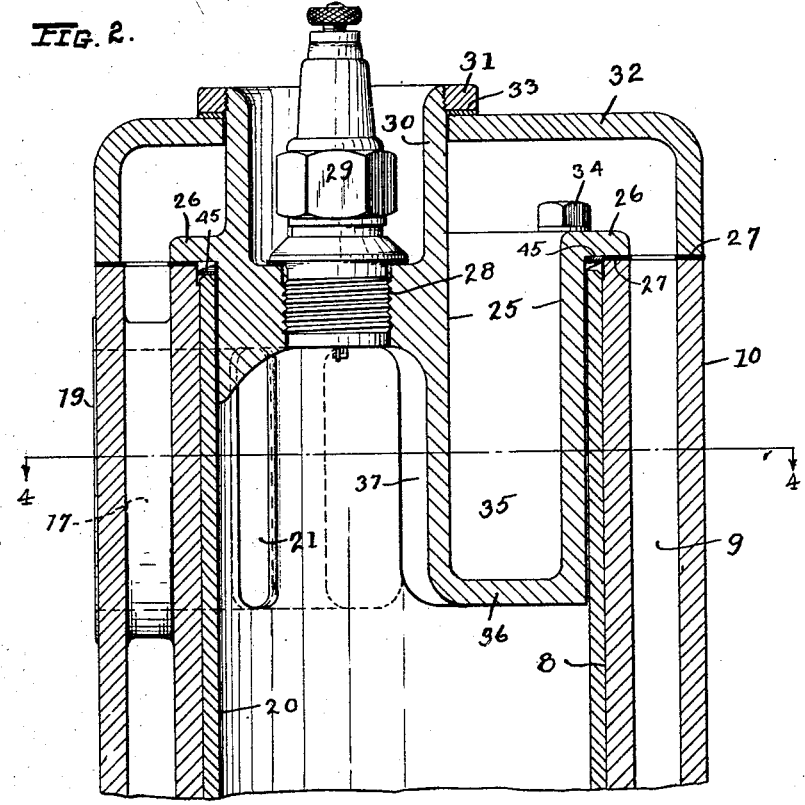
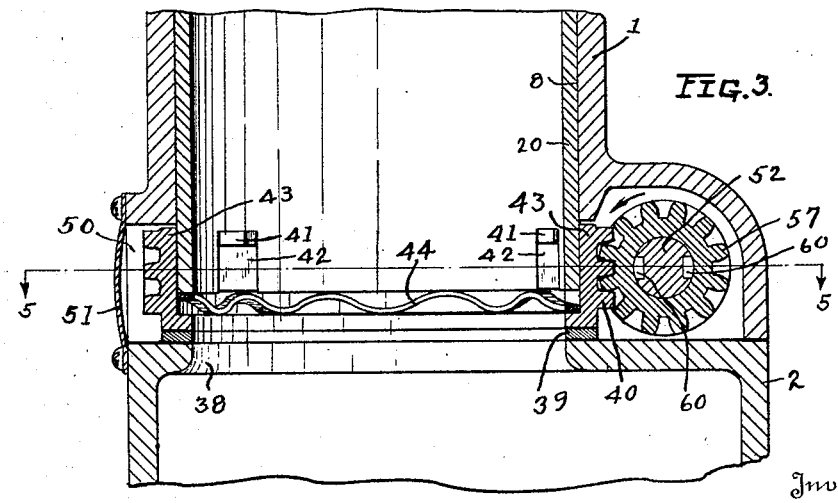

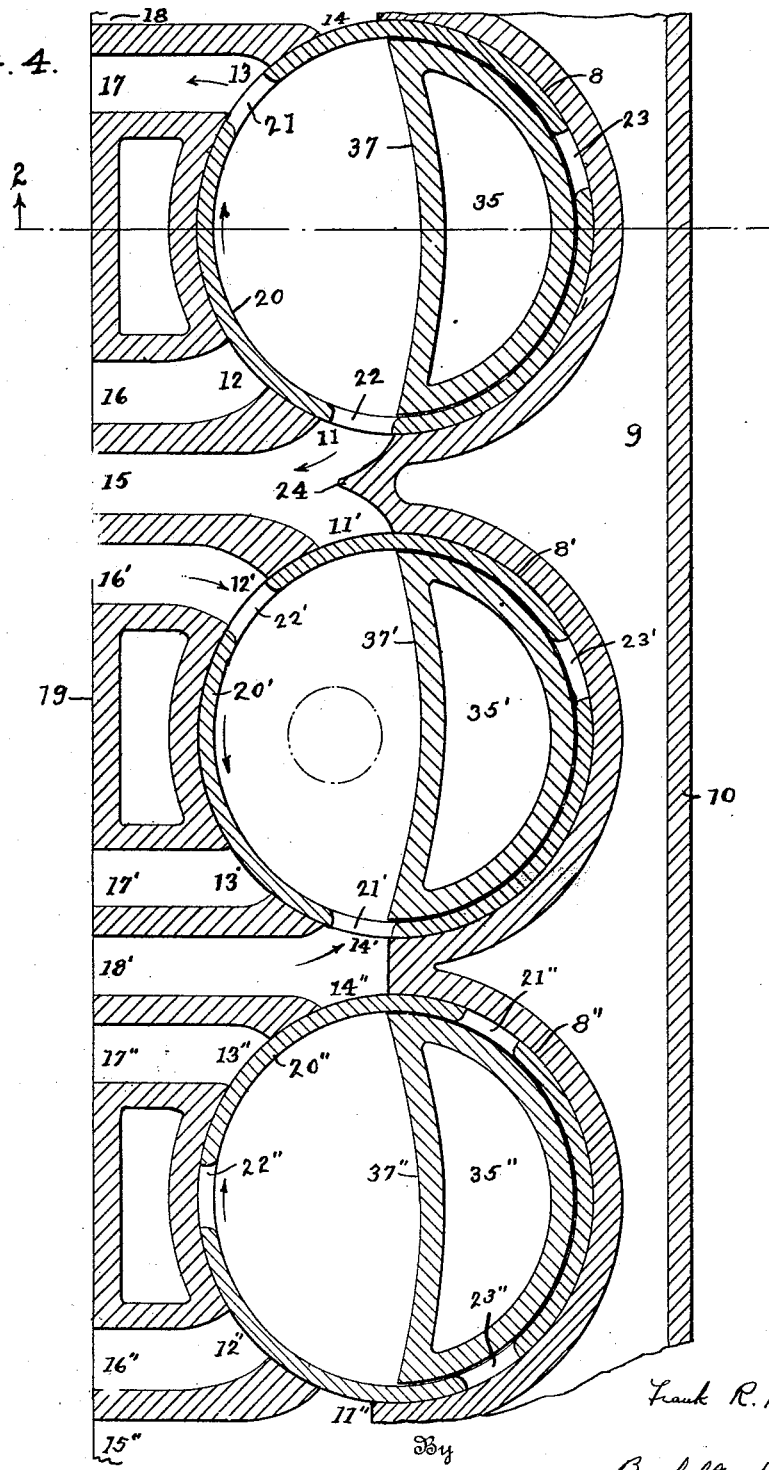

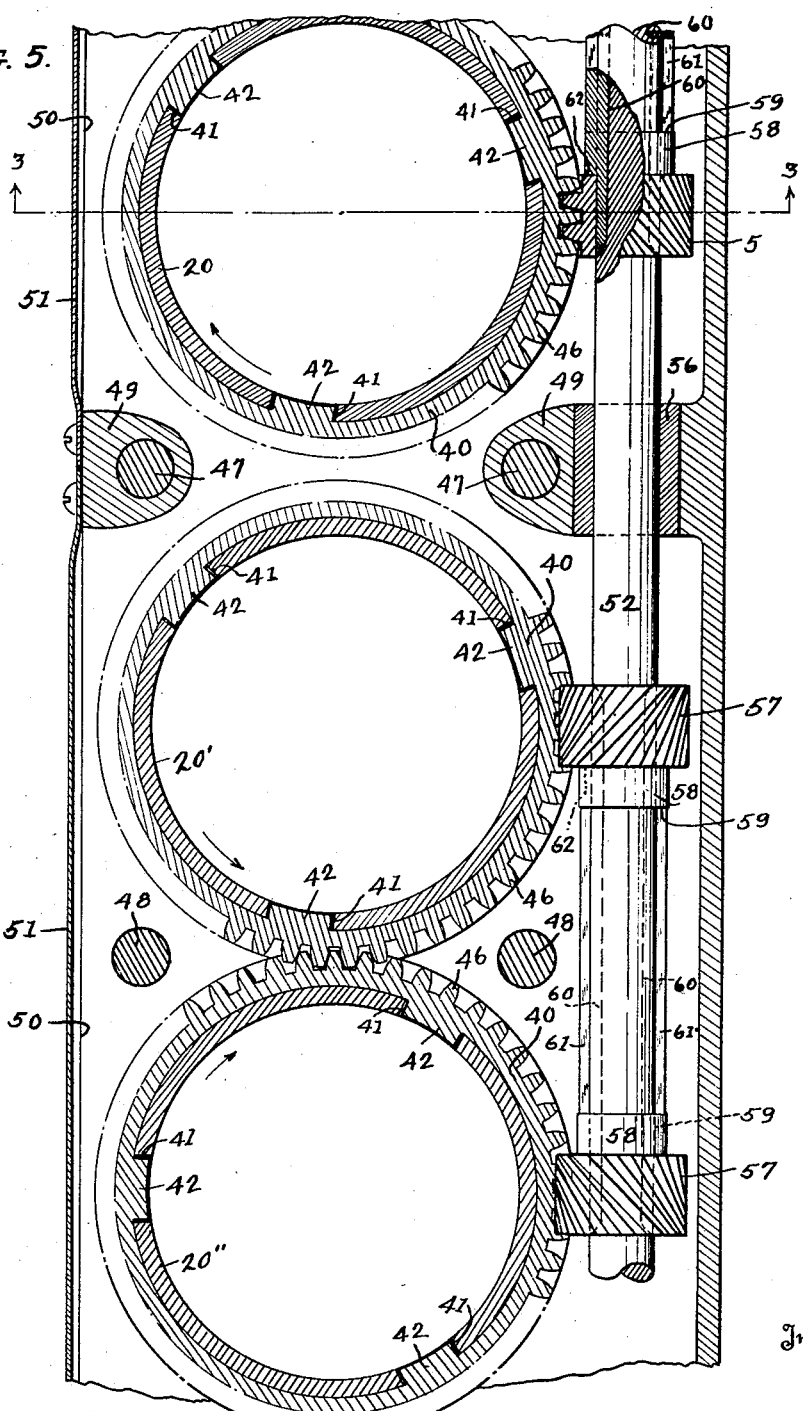

1,826,424

UNITED STATES PATENT OFFICE

FRANK R. HIGLEY, OF CLEVELAND HEIGHTS, OHIO

INTERNAL COMBUSTION ENGINE

Application filed November 4, 1927. Serial No. 231,025.

This invention relates to internal combustion engines and more particularly to that type of engine in which a rotating valve is employed for the purpose of controlling the inlet and exhaust of each combustion chamber thereof. The invention more particularly pertains to valve and port arrangement, to combustion chamber form and arrangement, and to valve actuating means, as will appear.

In any internal combustion engine the function of the valves is to open and close the ports thereof to control the inlet to and exhaust from the combustion chamber, and a well-known principle of design is that the inlet port area and timing of the inlet valve be such that a maximum charge may be induced into the combustion chamber in the time allotted; and similarly, that the combustion chamber be as nearly evacuated as possible and in the least time to make way for the next succeeding charge. The factors controlling such accomplishment are not only that the port area be of proper size, but, in addition, are the shape of the combustion chamber, the arrangement of the ports therein, the arrangement of the passages to the ports, the type of valves controlling the ports, and the characteristics of the valves as to their operation. Well-known problems in combustion chamber design are that the chamber be as nearly spherical or equi-dimensional as possible, that the shape be such that the inlet and exhaust flow may be as nearly as possible in the direction of piston movement, and that the electrodes of the ignition plug be located as nearly as possible at a point equi-distant from other portions of the chamber. While for many reasons a maximum port size is desirable, a factor of equal desirability is that at the time of ignition a high degree of turbulence exists within the combustion chamber, and merely an increase in port area is ordinarily obtained at a sacrifice of the factors capable of producing turbulence, at least where rapidity of flow through the intake port is relied upon to effect turbulence.

Objects of my invention are therefore to so arrange the parts that an ideal form of combustion chamber is obtained; that flow into the combustion chamber and exhaust therefrom may take place through ports of ample area in the most direct manner possible.

An important requirement of valve design is that the ports be opened and closed as quickly as possible and usually particularly that the inlet valve be closed with utmost rapidity. A further object of my invention is to provide for sufficient opening and closing speeds.

Another object of my invention is to provide means for insuring a high degree of turbulence at the time of ignition.

Many rotating valves have heretofore been devised for the purpose of controlling the ports of internal combustion engines, but have been unsuccessful due to lubrication difficulties and particularly to tendencies to carbonization when sufficiently lubricated. An object of my invention is to provide a valve proper lubrication of which may be had without affecting the normal functioning of the valve or combustion chamber.

Another difficulty encountered in rotary valve practise is that of maintaining compression throughout the temperature ranges over which the parts must function. An object of my invention is to provide a design of valve and port arrangement wherein the sealing efficiency of the valve is not materially altered by temperature changes.

The factors above enumerated, while of paramount importance, have been based fundamentally rather upon theory of operation than upon structural or more purely mechanical matters of design. One of the difficulties encountered in operation of rotary valves has been their tendency when carbonized to grind or abrade their seats, resulting in rapid wear and ultimate loss of compression. Another objection has been the noise resulting from employment of gearing running at high pitch speeds. An object of my invention is therefore to so arrange the valve and more particularly the ports thereof with respect to the cylinder ports that the operating speed and hence the abrasive effect as well as noise of operation will be greatly reduced; and to further avoid such abrasion as would result in loss of compression.

With reference now to the drawings, Fig. 1 is a generally transverse section through an engine in which my invention is incorporated; Fig. 2 is a similar enlarged section of the head end portion thereof, the section being through the cylinder center line as in the plane of line 2—2 of Fig. 4; Fig. 3 is a section in the same plane showing details of the valve actuating portion of the engine as in the plane of line 3—3 of Fig. 5; Fig. 4 is a horizontal section through a portion of the head end of the engine as in the plane of line 4—4, Fig. 2; and Fig. 5 is a similar section as in the plane of line 5—5, Fig. 3.

The principal parts of the engine chosen for illustration of my invention, and their arrangement, are generally similar to what is at present standard practice in the internal combustion art with reference to operation on a four-stroke cycle, these parts comprising a cylinder block casting 1 mounted upon a crank case 2 in which is a crank shaft 3, upon each crank 4 of which bears the lower end of a connecting rod 5 having connection through a wrist pin 6 with a piston 7 in the corresponding cylinder.

The cylinder block 1 is bored out to form a number of aligned "cylinders" 8, 8', 8'', each cylinder being open at its top or head end and having a cooling water space 9 thereabout formed by a jacket wall portion 10 which extends around the block. Adjacent the head end on one side of the common diametrical plane of the cylinders, each cylinder is provided with a number of longitudinally elongated ports 11, 12, 13, 14, 11', etc., and 11'', etc., as indicated particularly in Fig. 4. In the cylinder block and extending between the lateral face 19 thereof and the several cylinder ports are a number of passages appearing in Fig. 4 and bearing reference numerals 15 to 18 therein. The ports 12 and 14 through the passages 16 and 18 are adapted for connection as through a manifold, not shown, with the usual carburetor; and the ports 11 and 13 similarly through the passages 15 and 17 are adapted for connection with a suitable exhaust manifold. These passages, and particularly those serving the inlet ports 12 and 14 are preferably so arranged, as by their curvatures appearing in Fig. 4, that the fluids passing through the ports may flow or be caused to flow in directions generally radial of the cylinder. Thus the flow into the cylinder by way of the inlet passages 16 and 18 will be in streams directed radially inwards and meeting, therefore, in the center of the cylinders. In each cylinder is arranged a valve 20 which may be of the sleeve type indicated, the piston being arranged for reciprocating movement therein.

Each valve 20 is provided with a number of ports, three, 21, 22, 23, being shown, equally spaced about and adjacent the head end thereof at elevation corresponding to that of the cylinder ports, whereby all of the ports lie in a common zone of the cylinder head portion. The spacing of each series or pair of cylinder ports corresponds with the spacing of the valve ports whereby, for example, the two inlet ports 12 and 14, shown, of each cylinder, will be opened and closed simultaneously by adjacent valve ports.

The valves are arranged for rotation in a manner to be described, in the direction of the arrows, Fig. 4, and the cylinder ports are properly located in their cylinders whereby the inlet ports and exhaust ports of each cylinder will be opened and closed in proper timed relation with the motion of the corresponding piston therein, whereby the cylinder may operate on the well-known four stroke cycle; and the timing or relative angular setting of the valves is such that a proper firing sequence will be had in the several cylinders, as will be well understood by one familiar with the art. In the engine shown, cylinders 8'', 8' and 8 are the first three cylinders respectively of a six cylinder engine arranged to fire in the order 1—5—3—6—2—4.

The valve ports are all of the same size. The cylinder ports have their lower edges lying flush with the piston head at the upper extremity of its stroke, and may vary somewhat from the dimensions and circumferential arrangement shown, according to the engine operating characteristics desired, as will also be well understood. As shown, the cylinder inlet ports 12 and 14 are equal in dimension with the valve ports, and the cylinder exhaust ports 14 are of the same size. The exhaust ports 11, however, are somewhat wider and located whereby they will correspondingly lead the ports 14 in opening, for a purpose to be described.

Between each adjacent pair of cylinder ports 11, and extending inwards of passages 15 is a projection 24 integral with the cylinder block, which serves as a baffle to prevent direct passage between the exhaust ports.

Each cylinder is provided at its head end with a closure member or so-called cylinder head 25 which may be conveniently a single casting as indicated, Fig. 2, having a flange portion 26 secured as by bolts 34 on the gasket 27 on the top face of the cylinder block about the periphery of the cylinder bore. Each cylinder head has an opening 28 properly threaded for reception of spark plug 29 and an upwardly extending portion 30 thereabout threaded at its upper extremity for reception of a nut 31. A jacket head 32 extends along the top of the cylinder block seating upon the outer extremities of the gasket 27 overlying the jacket wall portions 10 and having openings arranged to receive the upwardly extending portions 30 of the several cylinder heads. A gasket 33 is arranged to underlie each of the nuts 31 whereby tightening of the nuts 31 will effect sealing of the water jacket as a whole. A water inlet is provided in the wall portion 10 of the jacket and a water outlet in the head portion 32 thereof, whereby cooling circulation generally upwards may be maintained about the cylinders all in a manner well understood and old in the art.

Each cylinder head 25 has a depending portion 35 extending downwards within the cylinder and the valve therein and terminating in a transverse face 36 just clearing the head of the cylinder at its upper dead center and therefore lying in a plane just slightly above that of the lower edges of the cylinder ports. Each cylinder head is cut away or recessed adjacent the cylinder port area so that the depending portion 35 thereof is, in the zone of the ports, generally semi-circular in transverse section and therefore offset with respect to its cylinder axis, with a face 37 extending across the cylinder, and terminating adjacent the outer longitudinal edges of the outer cylinder ports 14 and 22; and the depending portion 35 thus serves to mask that portion of the head end of the valve not overlying the cylinder port area and to occupy large portion of the cylinder volume in the zone of the ports. Thus the streams entering the combustion chamber through the inlet ports will impinge upon the central portion of the face 37. That portion of the cylinder head extending within the cylinder is finished off cylindrically to just clear the valve without contact therewith. The depending portion of each head is hollow, as indicated, and open at the top for free communication with the cooling medium within the water jacket.

Thus the upper portion of the cylinder is divided by the wall 37 of the cylinder head into two portions: a combustion chamber on the one side and a mask on the other, the combustion chamber and mask being each of substantial volume, and each concentrated as it were, on its own side and thus offset with respect to the cylinder axis; and since there is this effect of concentration in structure there is corresponding concentration in functioning.

The upper face of the crank case 2 is finished off as usual and the lower cylinder block face similarly finished whereby a firm seat may be had between the two parts. The crank case is provided as usual with openings 38 aligned one with each cylinder for connecting rod clearance. Overlying and secured with the crank case and surrounding each opening 38 is a bearing washer or bushing 39. Seated upon each bushing 39 is a ring gear 40 counter-bored out as indicated to form a flange 43 to receive the lower extremity of the valve 20, and seating upon the bushing throughout the full bearing surface thereof; the cylinder block being cut away as indicated to provide clearance above and about the ring gear. The lower periphery of the valve is provided with a number of notches 41 preferably equal in number and aligned respectively with the valve ports. The ring gear 40 has corresponding inwardly projecting lugs 42 engaging the notches 41 but of inwardly extending dimensions to underlie the inner surface of the valve. The notches 41 are of greater longitudinal dimension than are the lugs 42. Between the lower extremity of the valve and therefore in supporting relation therewith and overlying the flange 43 of the ring gear is a spring 44. A similar spring 45 is positioned about the upper extremity of the valve bearing against the flange 26 of the cylinder head, sufficient clearance being provided for the purpose.

The cylinders in the block 1 are spaced in pairs whereby each is closer to one of its adjacent cylinders than to the other, and this spacing is such that the teeth 46 of alternate adjacent pairs of gears will mesh, with each other whereby, as indicated in Fig. 5, the teeth of each gear will mesh with those of the gear of one adjacent cylinder but will clear those of the gear of the other adjacent cylinder.

The lower extremity of the cylinder block 1 is secured with the crank case by a number of bolts 47 and 48. About the bolts 47, which lie between the most widely spaced pairs of cylinders, are spacer lugs 49 preferably integral with the cylinder block and terminating downwardly with faces finished flush with that surface of the cylinder block which bears upon the crank case. One side of the cylinder block in the plane of the gears 40 has an opening 50 provided with a suitable cover 51. No spacer lugs are provided adjacent the bolts 48 for a reason which will later appear.

Opposite the opening 50 and extending along the cylinder block in suitable bearings 56 therein is a shaft 52 driven by the engine crank shaft through any suitable connection such as the sprockets 53 and 54 and chain 55 appearing in Fig. 1, whereby the shaft 52 is rotated in a counter-clockwise direction, Figs. 1 and 3, in timed relation with the engine shaft, and in the engine illustrated at a speed 2/3 revolution to every one revolution of the crankshaft. On the shaft 52 opposite each ring gear 40 is a pinion 57 having teeth meshing with those of its ring gear. The teeth of the gears and pinions are helically arranged thereon, and in the example chosen for illustration, the tooth angle is 45° and the pitch diameters of the ring gears are four times the pitch diameters of the pinions, whereby the ring gears will be rotated at one sixth crank shaft speed.

Each pinion 57 has a hub portion 58. Each pinion with its hub portion is bored to freely fit upon the shaft 52, and the hub portions are transversely slotted as at 59. The shaft 52 is provided between each pair of bearings 56 with a pair of keyways 60 spaced at 180° and extending between and somewhat beyond the center lines of those most closely spaced pairs of ring gears. In the keyways 60 are keys 61 notched at their ends, as indicated, to form shoulders 62. The clearance between the shoulders 62 on each of the keys 61 is such that when the pinions 57 are placed in abutting relation therewith, the pinions will be in spaced relation as are their ring gears as shown in Fig. 5; and the arrangement is such that the pinions may slide but not rotate on the shaft.

Operation of the engine is as follows: The engine is arranged for operation of the crankshaft in a counterclockwise direction, Fig. 1, and the timing of the valves, of course, is such that a four stroke cycle of operations will be repeatedly effected in each cylinder. In detail, assuming the piston of any cylinder at the top of its stroke, as rotation of the crankshaft causes downward motion of the piston, the valve is rotated to open the intake ports 12 and 14 so that a charge of combustible mixture may be induced by suction into the cylinder. The valve 20′, Fig. 4, shows the cylinder inlet ports thus opened. As the inlet ports are opened the charge enters the cylinder in two angularly disposed streams moving in planes transverse of the cylinder, the streams impinging against the central portion of the opposite face of the cylinder head, and there meeting each other to set up a turbulence comprising a pair of swirling motions in planes transverse of the cylinder. These swirling motions are in opposite directions, and, as the charge is induced below the zone of the ports, probably continue as a pair of spirals. During the succeeding upward stroke of the piston the valve progresses to close all of the ports so that the contents of the cylinder are compressed, the valve being then approximately in the relative position of the valve 20″, Fig. 4. During this stroke of the piston the spiral swirls of charge may and probably do continue uninterrupted except for the compressive action of the piston, which converts the swirls back again from spiral to generally circular form. As the piston attains the top of its stroke, that portion of the cylinder contents lying between the piston head and the face 32 of the cylinder head is violently ejected towards the left, Figs. 1 and 2, sweeping upwards as it strikes the exposed portion of the valve and creating a violent swirling turbulence in the longitudinal plane and generally in a clockwise direction, Figs. 1 and 2, in the combustion chamber and consequently in traversing opposition to the pair of swirls originally set up. A spark is next effected at the electrodes of the spark plug 29 in the usual manner. The contents of the combustion chamber are ignited, and immediately expand to force the piston downwards with great power. As the piston reaches the bottom of its stroke the valve progresses in its travel sufficiently to open the exhaust ports 11 and 14 which remain open throughout the next succeeding upward stroke of the piston, whereby the products of combustion are forced out of the cylinder.

In fact, the cylinder exhaust ports are so arranged that the larger port 11 will first be opened by the valve. This is for the reason that the earlier edge of the exhaust port 11 is masked by the adjacent depending portion of the cylinder head, so that the corresponding cylinder surface uncovered by the valve port is protected by the cylinder head from the first outrush of the exhaust gases which are, of course, at that time under maximum pressure and at maximum temperature. This feature is important as it tends largely toward elimination of burning of lubricant of the cylinder wall at this point.

The crankshaft, as already described, is arranged to rotate counter-clockwise, Fig. 1, and the essential of such arrangement is that the throw of the cranks be towards the cylinder ports. Such arrangement is important in that it results in a tendency of the connecting rod to thrust the piston against the valve and hence the valve against the cylinder wall surrounding the ports during three strokes of the piston in its cycle, namely, during the exhaust, inlet, and compression strokes; so that the lateral thrust of the conecting rod is utilized to maintain the seating of the valve. By this arrangement therefore, the valve may fit more loosely in the cylinder than would otherwise be possible, the seating of the valve during expansion or combustion strokes being automatically taken care of by the combustion chamber pressure against the valve, unbalanced by the cylinder ports, the lateral resultant thereof being much greater than the opposed connecting rod thrust during the expansion or power stroke of the cycle.

As has already been described, the ports of each cylinder are arranged on one side of an axial plane thereof. By such arrangement, an efficient seating of the valve against all of the cylinder ports may be maintained by pressure of the valve against the cylinder in the general direction of the ports; the seating being comparatively independent of the fit of the valve in the cylinder. This is important, as it has been found that ordinarily a valve of dimensions to seat accurately when cold seizes when expanded under operating temperatures, or a valve which accurately and freely seats when warm will not maintain a seal when cold. Further, by spacing the valves widely about a semi-circular portion of the cylinder walls, the extreme cylinder ports will practically offset each other as to unbalanced fluid pressures upon the valve. Thus a greater port area is possible with an actual decrease in necessary valve actuating power.

It is also to be noted that the depending portion of the cylinder head occupies a large portion of the volume within the valve in the zone of the ports. This allows the use of a combustion chamber of relatively great longitudinal dimension, which in turn allows an equal corresponding dimension of the ports which may as a result be relatively narrow in circumferential direction. Thus ample port area may be employed without sacrificing the desirable quick opening and closing port characteristics.

It will be observed that during the inlet stroke of the cycle, the cool inrushing gas is drawn directly past the electrodes of the spark plug in two jets impinging in the central portion of the face 37 of the cylinder head and moving thence directly down into the cylinder, following the motion of the piston. Hence, at the time of intake cut off, the freshest and richest portion of the charge will be within the combustion chamber, so that any tendency to stratification will be in favor of the richest mixture surrounding the spark plug electrodes.

It will be noted that when the piston is at the top of its stroke a combustion chamber is formed, in the zone of the ports and bounded by that portion of the valve overlying the cylinder port area, the curved face 37 of the cylinder head, the spark plug and its adjacent portion of the cylinder head, and that portion of the piston head adjacent the cylinder port area. This combustion chamber, while not exactly equi-dimensional, is yet a somewhat nearer approach to such form than has been attained heretofore in the art to my knowledge. The combustion chamber is offset with respect to the cylinder and piston, the offset, however, not affecting the mechanical cooperation of the parts.

From a reference to Fig. 1 it may be observed that as the piston on its compression stroke approaches the illustrated position, that portion of the combustion mixture between adjacent faces of the mask 35 and the piston head, will be ejected violently to the left. The direction of ejecting is generally tangential of the combustion space; therefore the result is a swirl in clockwise direction. This swirl following as it does that set up during the suction stroke and being at right angles thereto, positively and efficiently insures a violent agitation of the entire contents of the combustion chamber at the instant of combustion, which of course is at or approximately at head-end of the crank-throw.

In addition, at the end of the exhaust stroke there is a similar ejection action between the same cooperating faces of mask and piston head; this time generally toward the now open exhaust ports, resulting in an increased ejector action when most needed.

The inner surface of the sleeve, in which the piston bears, is lubricated by splash from the crank in the usual manner. The outer surface of the sleeve, bearing in the cylinder, requires a minimum of lubricant, and for the purpose of lubrication thereof I provide a number of apertures 64 through which lubricant may find its way to the cylinder walls and spread thereon through capillary action. The location of the apertures 64 is optional, and they may be so located in the valve as to directly receive oil thereon by the crank as indicated, if desired.

As before stated, a clearance is provided between the valve and the portion of the cylinder head projecting therein. By such arrangement that portion of the inner surface of the valve in the zone of the ports may run dry or free from lubricant. Thus, all of the combustion chamber surface is dry except for that portion of the cylinder wall underlying the single valve port in the engine illustrated which is exposed at the time of combustion; two of the valve ports being masked by the cylinder head at this time.

By the provision of the springs 44 and 45, and the engaging means between the valve and the ring gear already described, while rotational movement of the valve is positively effected by its ring gear, a limited spring-opposed longitudinal motion is allowed the valve. It is possible that the valve may hence somewhat follow the motion of the piston; but, at least at the time of ignition, the valve being unbalanced as to pressure, will move downwardly to compress the lower spring 44 to a maximum, return or upward motion of the valve occurring with sufficient pressure drop in the cylinder and being yieldingly limited by the upper spring 45, the effect of the lower spring 44 upon the valve being limited by the lugs 42 described. This slight longitudinal valve movement is sufficient to prevent the cutting of the valve in the cylinder walls which would otherwise occur.

Preferably, the number of teeth on each ring gear is a multiple of the number of ports in the valve, and preferably, the notches 41 are aligned with the valve ports. By this arrangement, timing of the valves is a relatively simple matter and requires merely proper timing of the ring gears relative to their pinions. This is easily accomplished by employing the lugs 42 as indices, each ring gear being first placed in proper engaging relation with its pinion, whereupon engagement of the valve with its ring gear in any possible position will result in proper timing of the valve.

By the arrangement described, removal of any part of any cylinder assembly may be easily effected as follows, assuming the water jacket head portion 32 removed. By removal of the bolts 34, the cylinder head 25 may be withdrawn. The valve may be thereupon freely lifted out of the cylinder; or if it is merely desired to remove the ring gear thereof, assuming the cover 51 and outer bolt 48 removed, the valve is simply raised sufficiently to clear the ring gear, whereupon the same may be laterally slid upon the bushing 39 and rolled upon the opposite ring gear of its pair out through the opening 50. The bushing 39 may then be easily removed from its seat. Removal of the ring gears allows free access for inspection of the pinions. Disassembly of the pinions 57 from the shaft 52 for removal of the shaft 52 may be effected by sliding apart each pair of pinions (accompanied by corresponding movement of the ring gears if still in position), and removal of the interlying keys 61, whereupon the shaft may be slid longitudinally out of the cylinder block and the pinions slid off the shaft at the same time.

What I claim is:

1. In an internal combustion engine having a cylinder with a plurality of ports arranged on one side thereof, a valve arranged in said cylinder to control said ports, and a hollow head for said cylinder having a portion extending within said valve, with a mask portion of substantial volume projecting into the zone of said ports to mask that valve portion opposite the ports and cut away on the side of said ports to form a combustion chamber thereadjacent, whereby said cylinder head mask portion and said combustion chamber are oppositely offset with respect to said cylinder and separated by a face of said mask portion extending across said cylinder.

2. In an internal combustion engine having a cylinder with a plurality of elongated ports circumferentially spaced on one side thereof, a valve arranged for rotary motion in said cylinder to control said ports, and a hollow head for said cylinder having a portion extending within said valve, with a mask portion of substantial volume projecting into the zone of said ports to mask that valve portion not overlying the port group area, and cut away adjacent said port group area to form a combustion chamber offset with respect to said cylinder and bounded opposite said ports by a face of said mask portion extending across said cylinder.

3. In an internal combustion engine having a cylinder with a plurality of inlet ports circumferentially spaced on one side thereof, a valve arranged for rotary movement in said cylinder to control said ports together, and a head for said cylinder having a portion extending within said valve, with a mask portion projecting into the zone of said ports to mask that valve portion opposite said ports, with a face extending across said cylinder and opposite said ports, whereby fluid will enter said cylinder by way of said ports in a corresponding plurality of angularly disposed streams impinging on said face to set up swirls generally in planes transverse of said cylinder.

4. In an internal combustion engine having a cylinder with a plurality of ports arranged on one side thereof, a valve arranged in said cylinder to control said ports, a piston arranged for reciprocation in said valve, and a head for said cylinder having a portion extending within said valve, with a mask portion of substantial volume projecting into the zone of said ports to mask that valve portion opposite the ports and cut away on the side of the ports to form a combustion chamber, whereby said cylinder head mask portion and said combustion chamber are oppositely offset with respect to said cylinder, said mask portion terminating in a transverse face adapted to cooperate with the head of said piston as the latter completes its compression stroke, to eject that portion of the cylinder contents therebetween in the direction of said ports, and thus set up a turbulence in said combustion chamber in planes generally longitudinal of said cylinder.

5. In an internal combustion engine having a cylinder with a plurality of inlet ports circumferentially spaced on one side thereof, a valve arranged for rotary movement in said cylinder to control said ports together, a piston arranged for reciprocation in said valve, and a head for said cylinder having a portion extending within said valve, with a mask portion of substantial volume projecting into the zone of said ports to mask that valve portion opposite the ports and cut away on the side of the ports to form a combustion chamber, with a face extending across said cylinder and opposite said ports forming a wall of said combustion chamber, whereby fluid will enter said cylinder by way of said ports in a corresponding plurality of angularly disposed streams impinging on said wall to set up swirls generally in planes transverse of said cylinder, said mask portion terminating in a transverse face adapted to cooperate with the head of said piston as the latter completes its compression stroke, to eject that portion of the cylinder contents therebetween in the direction of said ports, and thus set up a turbulence in said combustion chamber in planes generally longitudinal of said cylinder, and generally transverse of said swirls.

6. In an internal combustion engine having a cylinder with a pair of inlet ports circumferentially spaced at 120° on said cylinder, and an exhaust port therebetween, and a valve arranged for rotational movement in said cylinder and having three equally spaced ports arranged in the zone of said cylinder ports, whereby by rotational movement of said valve, inlet and exhaust may be alternately had, inlet being simultaneous through two valve ports and exhaust through a single one of said two valve ports.

7. In an internal combustion engine having a cylinder with two pairs of ports, the ports of each pair being circumferentially spaced at 120° on said cylinder, the pairs of ports having connections respectively for inlet and exhaust, and each pair of ports having between them a port of the other pair, all of said ports lying on one side of a plane diametrical of the cylinder, and a valve arranged for rotational movement in said cylinder and having three equally spaced ports in the zone of said cylinder ports, whereby as said valve is rotated, successive pairs of said valve ports may be caused to register with alternate pairs of said cylinder ports, and a cycle of port functions may be completed in 120° of valve rotation.

8. In an internal combustion engine having a cylinder with a pair of inlet ports circumferentially spaced at 120° on said cylinder and an exhaust port therebetween, a valve arranged for rotational movement in said cylinder, and having three equally spaced ports arranged in the zone of the cylinder ports, whereby by rotational movement of said valve, inlet and exhaust may be alternately had, and a cycle of port functions may be completed in 120° of valve rotation, and a head for said cylinder having a portion extending within said valve with a mask portion of substantial volume projecting into the zone of said ports to mask that valve portion opposite the cylinder ports and cut away on the side of said cylinder ports to form a combustion chamber thereadjacent.

9. In an internal combustion engine having a cylinder with two pairs of elongated ports, the ports of each pair being circumferentially spaced at 120° on said cylinder, the pairs of ports having connections respectively for inlet and exhaust, and each pair of ports having between them a port of the other pair, all of said ports lying on one side of a plane diametrical of the cylinder, a valve arranged for rotational movement in said cylinder and having three equally spaced ports in the zone of the cylinder ports, whereby as said valve is rotated, successive pairs of said valve ports may be caused to register with alternate pairs of said cylinder ports, and a head for said cylinder having a portion extending within said valve, with a mask portion of substantial volume projecting within the zone of said ports to mask that valve portion opposite the cylinder ports and cut away on the side of said cylinder ports to form a combustion chamber thereadjacent, whereby said cylinder head mask portion and said combustion chamber are oppositely offset with respect to said cylinder and separated by a face of said mask portion extending across the cylinder.

10. In an internal combustion engine having a cylinder with a pair of exhaust ports therein, valve means movable in said cylinder to control said ports, mask means adjacent the leading edge of one of said ports, said port being arranged to be opened by said valve means before opening of the other port.

11. In an internal combustion engine having a cylinder with a plurality of inlet ports circumferentially spaced on one side thereof, and passages associated with said inlet ports to direct flow therethrough radial of said cylinder, a valve arranged for rotary movement in said cylinder to control said ports together, and a head for said cylinder having a portion extending within said valve, with a mask portion projecting into the zone of said ports to mask that valve portion opposite the ports, with a face extending across said cylinder and opposite said ports, whereby fluid will enter said cylinder by way of said ports in a corresponding plurality of streams radial of said cylinder, impinging on said face in the central portion thereof, to set up swirls generally in planes transverse of said cylinder.

12. In an internal combustion engine having a cylinder with a plurality of ports arranged on one side thereof and including an exhaust port, a valve arranged in said cylinder to control said ports, a piston arranged for reciprocation in said valve, and a head for said cylinder having a portion extending within said valve, with a mask portion of substantial volume projecting into the zone of said ports to mask that valve portion opposite the ports and cut away on the side of the ports to form a combustion chamber, whereby said cylinder head mask portion and said combustion chamber are oppositely offset with respect to said cylinder, said mask portion terminating in a transverse face adapted to cooperate with the head of said piston as the latter completes its exhaust stroke, to eject that portion of the cylinder contents therebetween in the direction of said exhaust port.

In testimony whereof I hereby affix my signature.

FRANK R. HIGLEY.